Nov. 25, 1930.　　　V. M. DORSEY　　　1,782,716
SHEET GLASS HANDLING MECHANISM
Filed April 13, 1929　　3 Sheets-Sheet 1
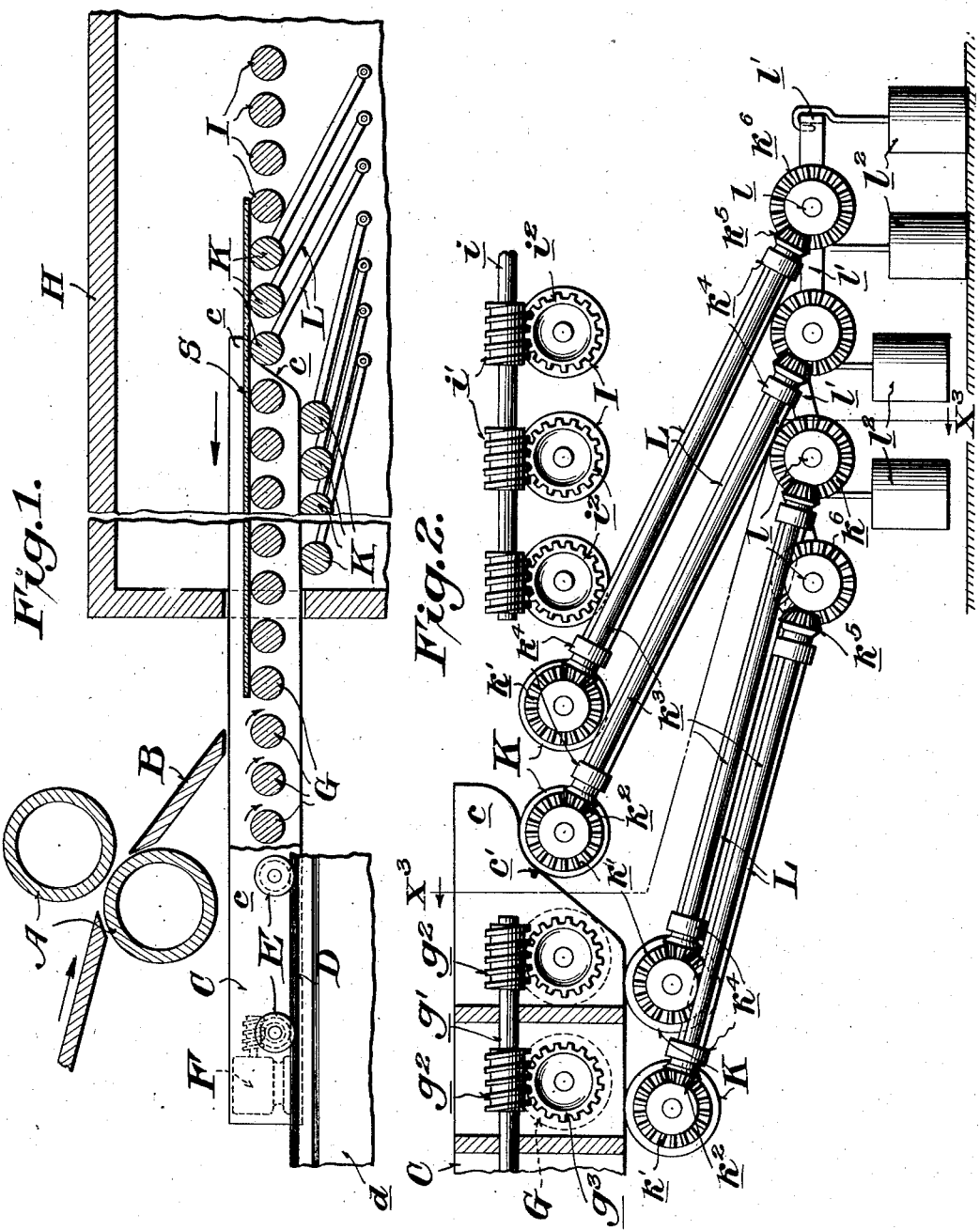
Inventor
Vernon M. Dorsey,
By
Attorneys

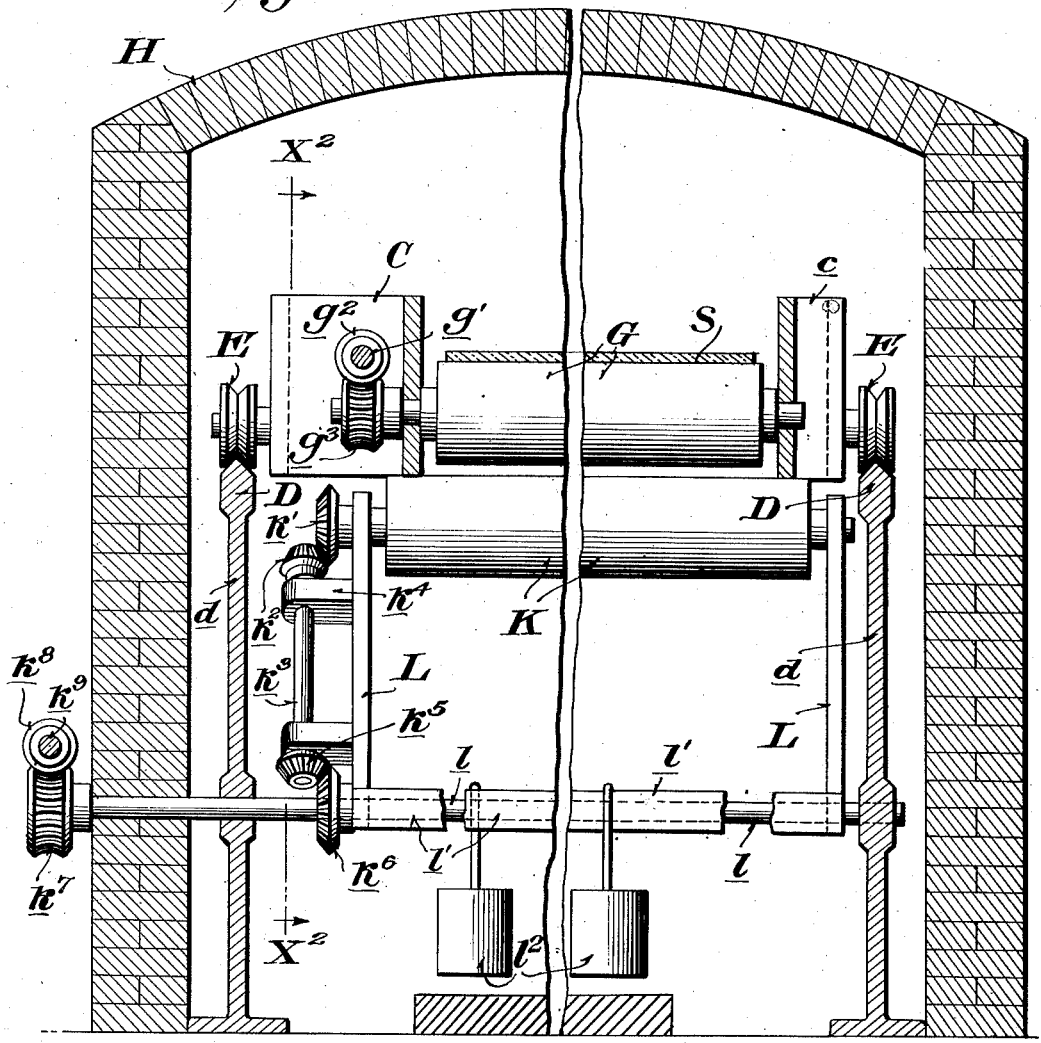

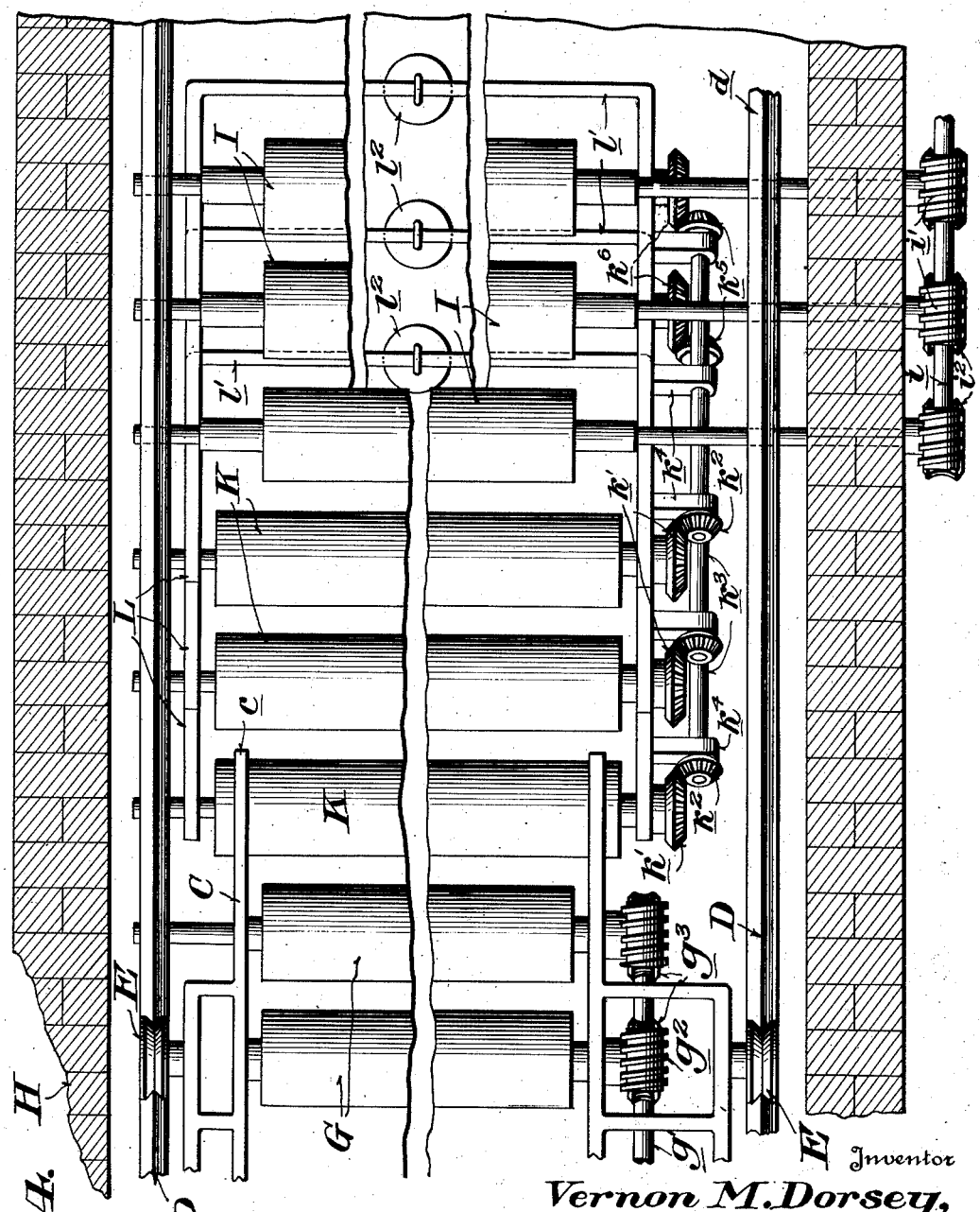

Patented Nov. 25, 1930

1,782,716

UNITED STATES PATENT OFFICE

VERNON M. DORSEY, OF CHEVY CHASE, MARYLAND, ASSIGNOR TO THE AMERICAN BICHEROUX COMPANY, OF WILMINGTON, DELAWARE, A CORPORATION OF DELAWARE

SHEET-GLASS-HANDLING MECHANISM

Application filed April 13, 1929. Serial No. 354,880.

The invention to be protected hereby comprises (among other features) a lehr conveyor, a portion of which is mounted for vertical movement, and a carriage for a glass sheet movable in respect to the lehr conveyor and in the line thereof, with means for advancing the carriage into the space previously occupied by a portion of the conveyor, and for retracting it, the arrangement being such that as the carriage is advanced the movable portion of the lehr conveyor is displaced, and as the carriage is retracted such portion successively moves back into the vertical position in which it was located so as to receive the sheet when fed from off the carriage onto the lehr conveyor.

It has been proposed to receive glass from an intermittent forming machine on a carriage moving under the forming machine and having a glass receiving surface formed by rollers. In receiving the sheet the carriage was to move horizontally in the direction of feed of the sheet at a speed less than that of sheet formation and of the speed of delivery of the sheet to the carriage, and the rollers were to be rotated in such direction and at such speed that the sheet is moved forward by the conjoint action of the table and of the rollers at the speed of sheet formation or slightly higher. The carriage at the end of its forward movement was to stop with its forward end adjacent to the rear end of the conveyor of the lehr, the surface of the carriage and the lehr conveyor being at the same level. The sheet was then transferred from the carriage to the lehr conveyor by the continued rotation of the rollers of the carriage. In such an arrangement the peripheral speed of the carriage rollers at all times could be made the same as the speed of the lehr conveyor and the speed of movement of the carriage was then that of the difference of the speed of sheet formation and the peripheral speed of the carriage rollers.

It has been further proposed to cause such a carriage to run to a position such that its forward end is above the lehr conveyor and to then deliver the sheet to the latter on the backward movement of the carriage by the rotation of the rollers on the carriage. In such a case the peripheral speed of movement of the rollers on the carriage in delivering the sheet to the lehr conveyor was equal to the lehring speed plus the speed of backward movement of the conveyor. It was then possible to maintain the peripheral speed of the carriage rollers the same while receiving and when delivering the sheet by selecting proper speeds for the receiving and delivery motions of the carriage.

In the system last described the delivery of the sheet from the carriage to the lehr conveyor was effected by a movement of the sheet down an incline onto the lehr conveyor. In certain cases this may not be desirable and the object of this invention is to provide for the delivery of the sheet from a carriage moving backwardly at the time of delivery onto a lehr conveyor without necessitating any bending of the sheet, and for this purpose it includes a lehr conveyor comprising a series of driven conveyor rollers mounted for independent movement in respect to the level of the carriage rollers and depressed on the advancing movement of the carriage and moving back to their normal level to receive the sheet as the carriage recedes.

Referring to the accompanying drawings in which corresponding parts are designated by corresponding marks of reference,—

Figure 1 is a diagram representing the operation of the invention herein disclosed.

Figure 2 is a fragmental vertical longitudinal section taken on line $X^2$, $X^2$ of Figure 3, showing a mechanism embodying this invention.

Figure 3 is a vertical transverse section taken on the line $X^3$, $X^3$ of Figure 2.

Figure 4 is a plan view of the structure shown in Figure 2.

Referring to the showing of Fig. 1, A represents the forming rolls of an intermittent glass forming machine and B the apron down which the glass formed at the pass between the rolls slides. Beneath the forming machine a carriage C moves on a track D, the carriage being provided with wheels E to permit this movement. The movement of the carriage may be caused by a proper electric motor F.

The carriage comprises two side members c spaced apart a distance at least equal to the desired width of the sheet, having mounted therein and between them rollers G which form the glass receiving surface of the carriage. It will be understood that these rollers are rotated by any desired mechanism, the direction of rotation being such that their upper surfaces move in the direction of the feed of the glass sheet delivered down the apron B.

The forming machine is located opposite the entrance of a proper lehr H and the carriage C is adapted in its forward movement with the sheet to enter the lehr. Located within the lehr are a series of fixed lehr-conveying rollers I driven at a speed to cause the movement of the sheets of glass through the lehr at the desired lehring speed. These rollers are on the same level with the rollers G in the carriage, and the first of the rollers I is located at a distance from the forming machine about equal to the length of the carriage C. Between the first of the rollers I and the entrance to the lehr are mounted a series of lehr-conveying rollers K driven in the same direction as the rollers I and at the same speed, but being capable of being successively depressed by the front end of the carriage C as the latter advances into the lehr, and of successively rising to a position in which they are at the same level as the rollers G and I as the carriage moves from over them in its rearward motion.

With such a construction, if it be presumed that the forming machine forms glass at the rate of 50 ft. a minute and a proper lehring speed is 5 ft. a minute and that the rollers K and I have that peripheral speed, and the rollers G at a speed of 15 ft. a minute the formation of the sheet is started with the carriage in such position that an intermediate part of it is beneath the end of the apron B. The carriage is moved towards the lehr at a speed substantially equal to the difference between the forming speed and the speed of the rollers G, i. e., about 35 ft. per minute. The glass is therefore laid on the rollers of the carriage as the carriage moves under the apron and is simultaneously advanced on the carriage. The forward movement of the carriage into the lehr successively depresses the rollers K. About the time the front end of the sheet has by the rotation of the rollers G been brought to the forward end of the carriage, and after the delivery of the sheet to the carriage has been finished, the motion of the carriage is reversed and the carriage moved rearwardly, as represented by the arrow in Fig. 1. If, as presumed, the rollers G continue in their rotation at their previous peripheral speeds, the sheets will be fed from the forward end of the carriage at the rate of 5 ft. a minute, and if under these circumstances the carriage be moved rearwardly at a speed of 10 ft. a minute the feed of the sheet in space resulting from the rotation of the rollers G and the movement of the carriage will cause a forward feed thereof of 5 ft. a minute, which is the peripheral speed of the lehring rollers I and K. Hence the sheet will move from the rollers G onto the rollers I without being subjected to buckling strains. As the carriage moves back the rollers K lift successively adjacent its forward edge to receive and support the sheet S, as is represented in Fig. 1. When the delivery of the sheet has been completed from the carriage the carriage is restored to its initial position and the formation of a new sheet started.

Instead of rotating the rollers G at a speed of 15 ft. a minute they may be rotated at a much higher speed, say, 25 ft. a minute, in which case the motion of the carriage in receiving a sheet will be 25 ft. a minute, and in delivering the sheet will be 20 ft. Other speeds of rotation of the rollers G may be selected in accordance with the results to be obtained. One advantage of selecting the lower peripheral speeds for the rollers G is that it results in a higher speed of the carriage in receiving the sheet and this in turn aids in a closer packing of the sheets in the lehr with any given interval between the formation of successive sheets. For instance if a sheet is formed every ten minutes and is 50 ft. long and the delivery to the rollers I is coincident with the termination of the forming operation, there would be, if the carriage did not move during the time it was receiving a sheet, an interval of 45 feet between the trailing end of one sheet and the forward end of the next sheet. However, if the carriage is moved forward at the rate of 35 ft. a minute, as above suggested, the forward end of a sheet will be laid on the lehr conveyor practically abutting against the trailing end of the previous sheet.

However, the delivery of the sheet may be made to made to the carriage when the latter is stationary by giving the rollers G the same speed as the speed of sheet formation. With this speed unchanged the delivery to the lehr conveyor will be effected by a backward movement of the conveyor at a speed of 45 feet per minute.

In certain cases it may be of advantage to rotate the carriage rollers at different speeds during the advancing and retracting movements of the carriage, and my invention is not restricted to driving the several rollers at uniform speed at all times. On the contrary even when the speed of the carriage rollers is varied from time to time it has the advantage of permitting close packing of the sheets with a single group of rollers, instead of requiring several groups of variable speed rollers.

In Figs. 2, 3 and 4 I have represented mechanisms whereby the results above described may be obtained. As there shown the rollers G of the carriage C are driven from the longitudinal shaft $g'$ through the worms $g^2$ and worm wheels $g^3$, the latter being fast on the axes of the rollers G. Such shaft may be driven in any approved manner. The carrying wheels of the carriage are shown as running on the track D supported on the longitudinal stationary members $d$ extending throughout the length of travel of the carriage, and if desired throughout the length of the lehr, and serving as a support and bearing for certain shafts hereinafter named.

The rollers I are supported in the longitudinal stationary members $d$ and are driven from the longitudinal shaft $i$ by means of the worms $i'$ and the worm wheels $i^2$, the latter fast on the shafts of the rollers I.

Each of the rollers K is carried by a pair of radius arms L, one radius arm being at each end of the roller, the radius arms being sleeved on the corresponding shafts $l$ mounted near the base of the longitudinal members $d$. The lower ends of the radius arms are connected by a cross member $l'$ from which is hung a weight $l^2$ tending to lift the corresponding rollers K to a position level with the rollers G and I.

The forward ends of the side members $c$ of the carriage have inclines or camways $c'$ which act to depress the several rollers K as the carriage is advanced into the lehr, the roller being then held down until the return of the carriage by means of the flat face on the bottom of such side members.

In order to drive the rollers K with the proper speed each has on one of its ends a beveled gear $k'$ meshing with a beveled pinion $k^2$ on the upper end of a shaft $k^3$ carried in brackets $k^4$ projecting from one of the corresponding radius arms L, the shaft having on its lower end a beveled pinion $k^5$ meshing with a beveled gear $k^6$ fixed on the shaft $l$, such shaft projecting to the outside of the lehr structure where it is driven through the worm wheel $k^7$ by the worm wheel $k^8$ fast on a longitudinal shaft $k^9$.

While I have described the glass receiving surface of the carriage as formed by the rotating rollers, it is obvious that in so far as concerns the claims hereinafter made such surface may be of any form which will properly receive and support the sheet, and which will give such sheet a movement in the line of movement of the carriage, and in respect to the carriage. Likewise the specific construction of the feeding elements of the lehr may be varied, although I have likewise shown them as rollers.

In the above specification and in the following claims I have referred to the structure H as a lehr and to a lehr conveyor. It will be observed that some or all of the rollers K and some of the rollers I may be outside of and in front of the lehr proper without departing from the spirit of my invention.

Having thus described my invention what I claim as new and desire to secure by United States Letters Patent, is:

1. In a device of the character described, the combination with a travelling carriage having a glass receiving and feeding bed, of a lehr conveyor comprising glass feeding devices mounted for movement out of and into the path of the carriage, and means for moving the devices successively substantially into line with the glass receiving and feeding surface of the carriage as the latter recedes.

2. In a device of the character described, the combination with a travelling carriage having a glass receiving and feeding bed, of a lehr conveyor comprising glass feeding devices mounted for downward movement in respect to the path of the carriage, and means for lifting the devices successively substantially into the plane of the glass receiving and feeding surface of the carriage as the latter recedes.

3. In a device of the character described, the combination with a travelling carriage having a glass receiving and feeding bed, of a lehr conveyor comprising glass feeding rollers mounted for rising and falling movements, and means for lifting the rollers successively substantially to the level of the glass receiving surface of the carriage as the latter recedes.

4. In a device of the character described, the combination with a travelling carriage having a glass receiving and feeding bed, of a lehr conveyor comprising glass feeding rollers normally held in the path of movement of the carriage, but mounted for rising and falling movement, and means on the carriage for successively depressing the rollers as the carriage advances.

5. In a device of the character described, the combination with a travelling carriage having a glass receiving and feeding bed, of a lehr conveyor comprising glass feeding rollers normally held in the path of movement of the carriage and at substantially the level of the glass receiving surface of the carriage, the initial rollers being mounted for rising and falling movement, and means on the carriage for successively depressing the rollers as the carriage advances.

6. In a device of the character described, the combination with a travelling carriage having a glass receiving and feeding bed movable in respect to the carriage, of a lehr conveyor comprising two series of feeding rollers, the rollers of the first series being mounted for rising movement into the path of the carriage, the carriage having inclines at its forward end to depress the rollers on the advancing motion of the carriage.

In testimony whereof I hereunto affix my signature.

VERNON M. DORSEY.